United States Patent [19]

Hunter

[11] 4,200,988
[45] May 6, 1980

[54] WHEEL ALIGNMENT CHECKING DEVICE

[76] Inventor: Lee Hunter, 13501 Ladue Rd., Creve Coeur, Mo. 63141

[21] Appl. No.: 942,315

[22] Filed: Sep. 14, 1978

[51] Int. Cl.² .............................................. G01B 5/24
[52] U.S. Cl. ................................................. 33/203.2
[58] Field of Search ............ 33/203.18, 203.20, 203.21

[56] References Cited

U.S. PATENT DOCUMENTS

| 2,474,616 | 6/1949 | Castiglia | 33/203.18 X |
|---|---|---|---|
| 2,532,593 | 12/1950 | Bender et al. | 33/203.2 |
| 3,135,052 | 6/1964 | MacMillan | 33/203.2 X |
| 3,164,910 | 1/1965 | Manlove | 33/203.18 |

FOREIGN PATENT DOCUMENTS

| 1548203 | 9/1969 | Fed. Rep. of Germany | 33/203.2 |
|---|---|---|---|
| 394090 | 6/1933 | United Kingdom | 33/203.2 |
| 1015286 | 12/1965 | United Kingdom | 33/203.2 |

*Primary Examiner*—Charles E. Phillips
*Attorney, Agent, or Firm*—Gravely, Lieder & Woodruff

[57] ABSTRACT

A vehicle wheel alignment device for determining or checking the toe of the steerable wheels of a vehicle, and in which device the wheel toe measurements are displayed at the rear and front of the wheels to visually show the toe alignment, as well as being displayed, if desired, at a location beneath the vehicle adjacent the tie rod ends where wheel toe is normally adjusted.

6 Claims, 10 Drawing Figures

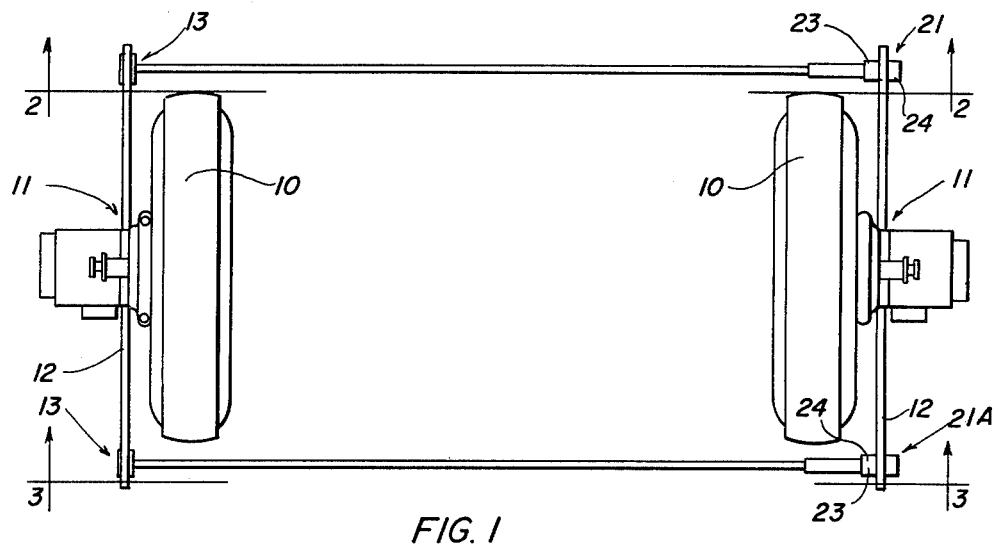
FIG. 1
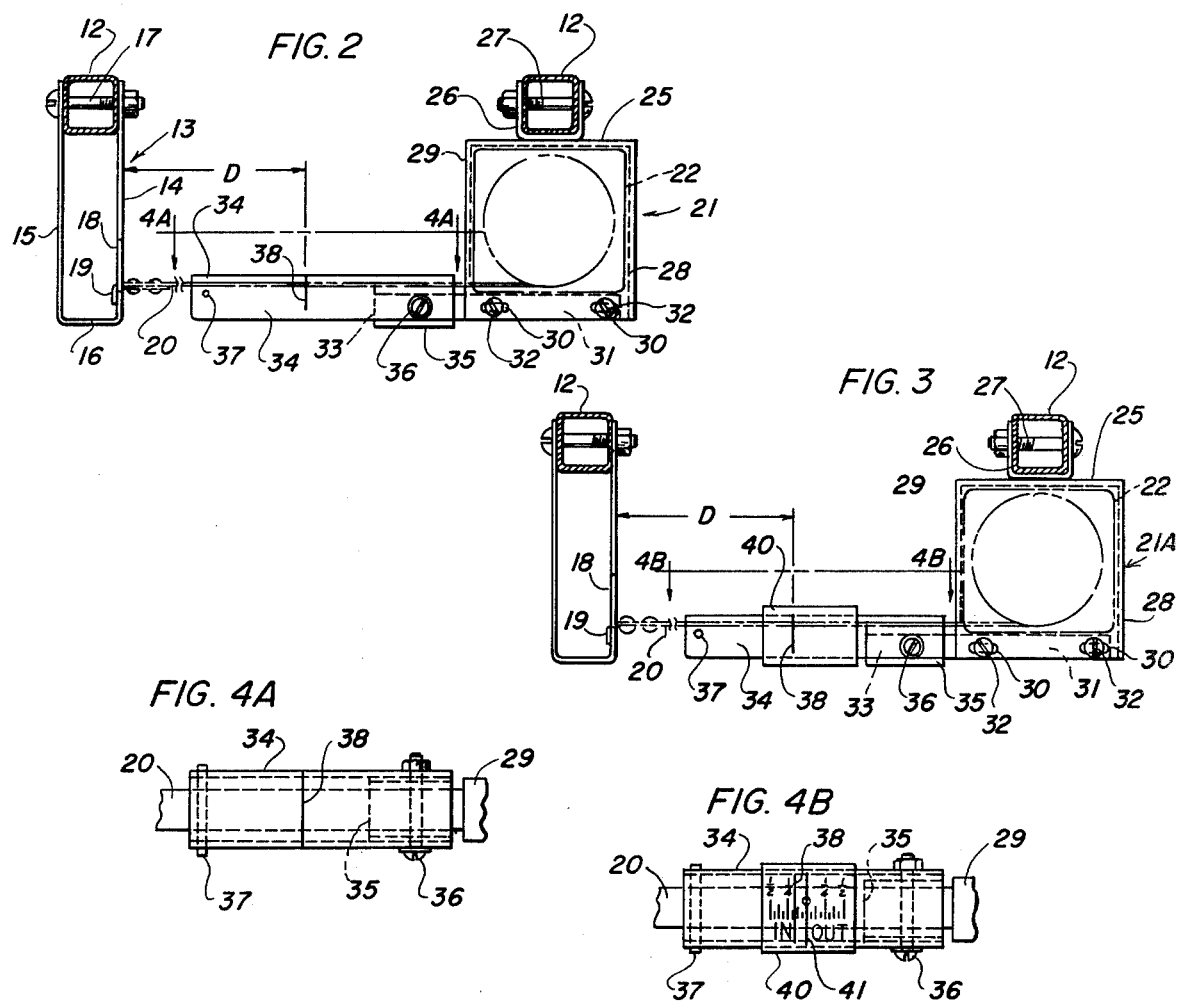

WHEEL ALIGNMENT CHECKING DEVICE

BACKGROUND OF THE INVENTION

Toe is usually measured in two positions relative to the steerable or front wheels of a vehicle. One position is at the rear of the wheels and the other position is at the front of the wheels. The purpose of making two measurements is to be able to check to see if the front portion of the two steerable wheels are closer together than the rear portions. The measurements are taken across the width of the wheels and if the front portions are closer together the wheels are said to be toed in.

Various devices have been provided for checking wheel toe, and there are a great variety of such equipment available commercially. Some of the equipment is quite expensive in that other alignment measurements can be checked, besides toe. An early toe measuring device is seen in Phillips U.S. Pat. No. 2,160,226 issued May 30, 1939. This device requires that it be mounted with its principal structures placed on machined surfaces at the outer ends of the wheel spindles. Another example of a toe alignment device is seen in MacMillan 3,135,052 which issued June 2, 1964. This device employs a support on each front wheel located to represent the plane of the tire side wall and having a length to project in front of and behind the tire tread so that a measuring rod can be applied to the ends at the front and rear to check the difference in the transverse dimensions at these two locations. A further wheel toe alignment indicator is shown in Wilkerson U.S. Pat. No. 3,426,438 issued Feb. 11, 1969. The indicator is electrically operated to indicate angular positions. These older pieces of equipment are improved upon by the herein preferred checking device.

BRIEF DESCRIPTION OF THE INVENTION

This invention relates to vehicle wheel toe alignment checking devices, and particularly to improved devices which are compensated for wheel run-out so as to establish the true running plane of the steerable wheels being checked.

The principal objects of this invention are to provide a simple to use wheel toe checking device having an inexpensive assembly of parts, to provide a wheel toe checking device that can be applied rapidly to vehicle wheels and is capable of being seen from the shop floor where the service is being performed, or can be observed by the mechanic working under the vehicle during wheel tie rod adjustments, and to provide a wheel toe checking device adaptable to a wide range of tire sizes.

A preferred embodiment comprises wheel run-out compensatable adapters applied to the wheel rims to carry support bars along side each wheel to project forwardly and rearwardly of the tire tread diameters, extensible measuring means mounted on one of the support bar end portions so as to be located just beyond the tire treads, anchor means on the other support bar end portions to be in opposed alignment therewith to retain the extensible measuring means in wheel toe checking positions, and means adjacent the measuring means and in observable locations to display the toe measurement in terms of the different transverse distances between the support bar end portions.

BRIEF DESCRIPTION OF THE DRAWINGS

The present invention is disclosed in a presently preferred embodiment in the accompanying drawings, wherein:

FIG. 1 is a plan view of a pair of steerable wheels of a vehicle and the attached toe checking apparatus of this invention;

FIG. 2 is a fragmentary sectional elevational view of the measuring means located behind the steerable wheel set for measuring the trailing dimension;

FIG. 3 is a fragmentary sectional elevational view of the measuring means located in front of the steerable wheel set for measuring the leading dimension;

FIGS. 4A and 4B are enlarged and fragmentary plan views of the right hand ends of both the rear and front tape measuring portions of the apparatus to show the comparison measurement observable thereon, the views being taken along line 4A—4A in FIG. 2 and along line 4B—4B in FIG. 3;

DETAILED DESCRIPTION OF THE INVENTION

Figure 5:
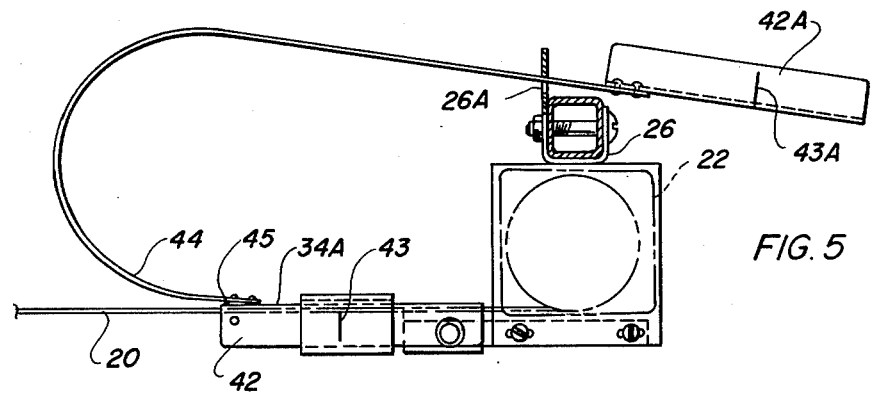
FIG. 5 is a fragmentary elevational view of a modified toe measuring device of a type observable from beneath the vehicle during adjustment of the tie rod.
Figure 6:
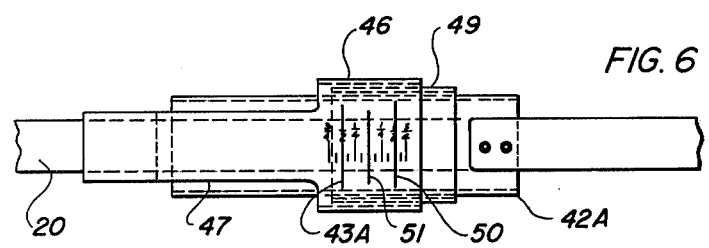
FIG. 6 is a fragmentary plan view of the modified toe device seen with the end member 43A and the cooperating elements in operative positions.

In the views of FIG. 1 it can be seen that each wheel 10 is provided with an adapter assembly 11 engaged on the rim of the wheel and operable to be compensated for wheel run-out. The compensation is intended to position a horizontally located support bar 12 carried by each adapter assembly 11 in position substantially parallel to the plane of wheel rotation. The accuracy of results of the present device is related to the bars 12 being representative of the plane of rotation of the wheels because that is a reliable reference from which to measure toe.

The support bar 12 mounted on each wheel has its opposite ends projecting forwardly and rearwardly of the wheel tread dimension so as to be exposed to view transversely of the vehicle. The bar 12 mounted on the left hand wheel 10 carries at its opposite ends retainer means 13 which are substantially identical. Each retainer means 13 is formed from sheet material bent into a U-shape to present opposite walls 14 and 15 joined at the lower ends by a base wall 16. The upper ends of the walls 14 and 15 are secured by bolts 17 directly to the bar 12. The inner wall 14 of each retainer means 13 is cut out to form an opening 18 for the reception and retention of the end fitting or hook 19 attached to a flexible measuring tape 20 to be referred to in more detail presently. The openings 18 face toward the opposite bar 12 on the right hand wheel 10.

In FIG. 2, at the right hand end there is mounted a housing 21 for a self-reeling tape contained in its own case 22. The tape may be one made by Roe International, Patchogue, N.Y., model PC10-3TT, or an equivalent which is capable of being pulled out to the required length so its end fitting or hook 19 will reach the opening 18 in the retainer means 13. The housing 21 is sheet material bent into a U-shape to form spaced side walls 23 and 24 joined at the top by a spacer wall 25. The spacer wall 25 is secured to a second U-shaped attaching member 26 which opens upwardly to embrace the end portion of the support bar 12 and be held by a pair of bolts 27. The side walls 23 and 24 are directed to be perpendicular to the axis of the bar 12, and the margins remote from the opposite bar 12 are connected by a closure piece 28 which extends the full length of the side walls. The other margins of the walls 23 and 24 are joined by a shorter length closure wall 29. The bottom margins of walls 23 and 24 are formed with slots 30 in spaced relation. A bottom closure block 31 is positioned between the bottom margins of the walls 23 and 24, after the tape case 22 has been inserted, and is secured by a pair of bolts 32 inserted through the respective slots 30 and bores in the block 31. The block 31 has an end 33 which projects beyond the closure wall 29 for the purpose of supporting a clear plastic channel member 34. The channel is held spaced above the block end 33 by a spacer element 35 held in place by bolt 36. The spacing of the channel member 34 above the block end 33 is to allow the tape 20 to pass under the member 34 so its indicia markings can be seen through the upper wall of that member 34. The outer end of the member 34 is provided with a keeper pin 37 for the purpose of keeping the tape end fitting 19 in a handy position to be grasped and pulled over from the bar 12 on the right hand wheel to the opening 18 in the retainer means 13 on the opposite bar 12 at the left hand wheel.

The bar 12 on the left hand wheel 10 has a second housing 21A adjacent its forward end for the purpose of positioning a second self-reeling tape which is the same as the above described tape made by Roe International, Patchogue, N.Y., model PC10-3TT, or an equivalent. The housing 21A is constructed in like manner and has parts arranged as above described so the same reference characters will be applied to avoid duplicate description.

In mounting the pair of tape cases 22 in the housings 21 and 21A, it is understood that the blocks 31 support the identical clear plastic channels 34 in position to allow the tapes 20 to be exposed thereby with the end fittings 19 engaged on the keepers 37 when not in use. Each channel 34 is provided with an index mark or line 38 scribed therein, and these marks are located at substantially the same measured distance D from the respective opposed retainer means 13. The reason for providing equal distance D as the location for the index 38 on each clear plastic member 34 is to be able to check the device by placing the supports 12 in a suitable check fixture at a short distance apart and extending each tape 20. If the bars 12 are substantially parallel the index marks 38 should be at the same distance value on the tapes 20. If there is some mis-matching of the distance readings, correction can be made by shifting the block 31, or either one, along the slots 30 and retightening the bolts 32.

When the foregoing embodiment of this invention is installed on the steerable wheels 10 of a vehicle, the tapes 20 are drawn out and the end fittings 19 are anchored in the retainer slots 18. A visual inspection of the distance marking on the tape 20 at the rear of the tread for the left hand wheel 10 is noted when it coincides with the index mark 38 on the plastic member (See FIG. 4A). The front index mark is similarly noted in its relation to the distance marking on the underlying tape 20. Normally the tape reading at the front of the tread should be less than the tape reading at the rear. In order to avoid having to mentally figure out the amount of that difference, a vernier slide 40 (FIGS. 3 and 4B) is provided with a zero index 41 and toe in and toe out scales at each side in increments, for example, of sixteenths inches. The vernier slide 40 is slipped over the member 34 at the front of the tread on the left hand wheel and moved to a position where its zero index mark 41 coincides with the distance figure on the underlying tape 20 which is the same as the reading on the tape 20 at the rear of this same wheel that registered with the index mark 38 on the rear member 34. For toe-in, zero index mark 41 should be found to be to the right of the underlying index mark 38 by the total toe-in of the two wheels 10. If the total toe reading on the vernier slide 40 is not what it should be, the tie rod under the vehicle needs to be adjusted to bring the wheel toe-in into proper setting.

A modified device is seen in FIG. 5 where only the measuring member at the front of the left hand wheel 10 has been changed. The new member 42 is the same size as member 34 it replaces and it has a similar index mark 43. The difference is that a flexible strip 44 has one end attached to the outer end of a clear plastic member 42 through a wedge element 45 so the strip 44 will be elevated to a position above the measuring tape 20 so its weight will not add to the normal sag in that tape. The strip 44 is made long enough so its free end will extend under the vehicle at the front where a mechanic is able to see the toe measurement and follow changes while adjusting the tie rod. It is also possible to use the modified device on both front and rear tapes 20, the index marks on its member 42 being the same as the index marks on the original members 34 seen in FIGS. 2 and 3.

Figure 7:
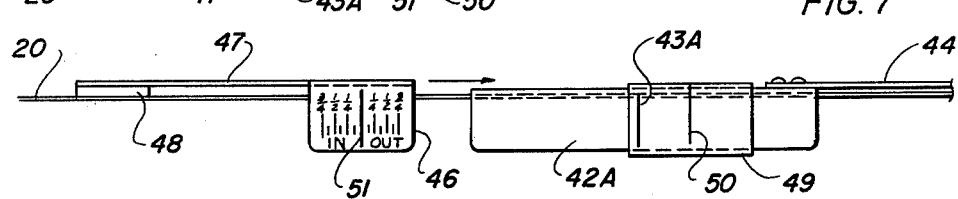
FIG. 7 is another view of the modified device in fragmentary elevation with the parts displaced for clarity.

The free end of the strip 44 is provided with a clear plastic second measuring member 42A carrying an index mark 43A. The member 42A is a channel which fits rather loosely over the tape 20 so its index mark 43A registers with some dimension value on the tape 20. Just which value is registered with the mark 43A is not important to the operation of the modified device. The modified device includes a modified vernier in the form of a clear plastic channel body 46 having an extension arm 47. The arm 47 supports a magnetic block 48 to engage the tape 20 and hold the vernier body 46 in a position where its indicia can be aligned with the mark 43A on the member 42A. The channel body 46 is dimensioned so it will fit down over the body of a clear plastic vernier slide 49 previously placed on member 42A (FIG. 7). The slide 49 has a single index mark 50 scribed thereon which is provided so the slide 49 can be located with its mark 50 spaced from the underlying mark 43A at a distance equal to the difference of the measurement readings on the rear positioned tape 20 and the front positioned tape 20. The modified vernier body 46 is scribed on its top and two sides with toe in and toe out scales which are one-half the real dimensions, and the zero mark 51 on these half-size scales in located midway of the distance between the underlying marks 43A and 50. When this mark 51 is lined up correctly, the vernier body 46 will then be attracted to the tape 20 by the magnetic block 48. Thus, as tie rod adjustments are made to move the wheels 10, the tape 20 at the front of the wheel treads will change its length and move the vernier body 46 relative to the two underlying marks 43A and 50. The reason for the one-half scale on the body 46 is evident when it is realized that as the front portions of the wheels 10 are moved, the rear portions move a like distance in the opposite direction which will produce twice the desired change in the toe alignment. By using a one-half scale on body 46 the movement needed to obtain the correct toe adjustment will be incorporated in the modified device, and no mental calculation will be required.

Since the measuring tape is flexible it will sag to some extent, but the catenary curve is so shallow it will not introduce significant variation in the measurement. In using a flexible tape to make it easy to reel in for storage, the attachment of the modified vernier needs to be as light weight as possible. A plastic material for the magnetic block 48 fits this requirement, but it is recognized that a non-magnetic clip or suitable connecting means may be employed in place of the block 48. Furthermore, the device of FIG. 5 when not is use can be folded back and placed in a slotted retainer 26A form as a part of the U-shaped attachment member 26. If the device of FIG. 5 is also attached to the rear tape, it will be constructed as set forth above.

Figure 9:
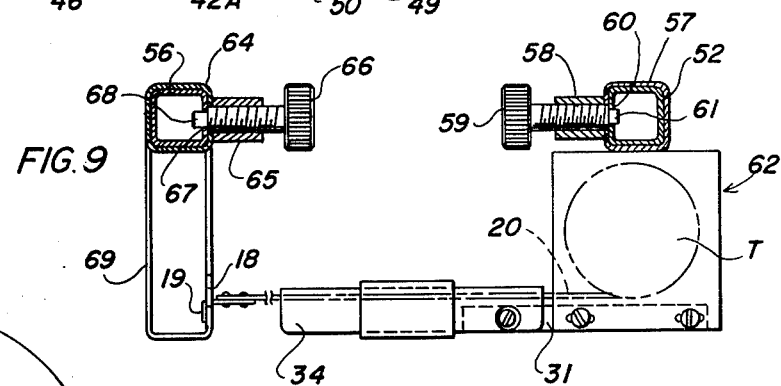
FIG. 9 is a fragmentary sectional elevational view of the modified checking device as seen along line 9—9 in FIG. 8.
Figure 8:
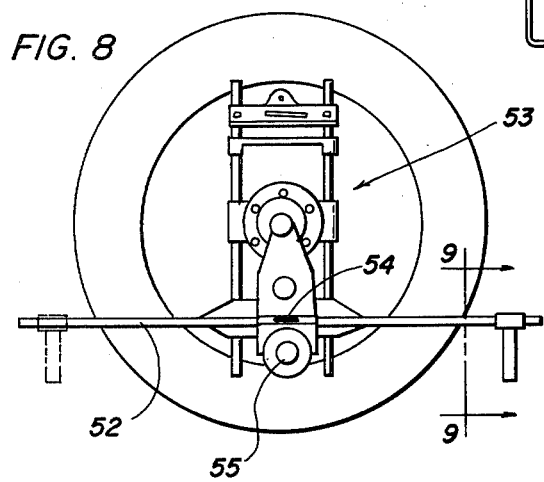
FIG. 8 is an elevational view of a further modification of the present invention showing a device which is interchangeable between the rear and front positions of a pair of wheels, and adjustable for different wheel sizes.

A further modification of the present invention is seen in FIGS. 8 and 9 which disclose means for mounting the supporting adapters for the checking device on the steerable vehicle wheels so as to accurately position the support bars 52 in position to extend rearwardly and forwardly of the wheel tread. In addition to compensating for wheel run-out the adapter 53 is provided with a bubble level 54 to be used in positioning the support bar 52 in a horizontal position. The adapter also is provided with a camber adjustment dial 55, but this is not related to the present invention. The adapter 53 shown in FIG. 8 is typical of the adapter to be applied to the opposite steerable wheel (not necessary to show, but similar to FIG. 1), and the opposite adapter supports the cooperating support bar 56 which is best seen in FIG. 9.

The rearward end of the support bar 52 carries a slidable sleeve 57 which is formed with a threaded projection 58 for the reception of a threaded locking pin 59. The support bar 52 is provided on its surface facing the opposite wheel with a series of apertures 60 which are spaced apart longitudinally of the bar 52 at desired intervals suitable for matching the range of tire sizes for which the checking device is useful. As seen in FIG. 9 the inward end 61 of the locking pin 59 is registered in one of the apertures 60 for the purpose of securing the sleeve 57 in position. The sleeve 57 is used to support the case 62 which is provided to house the self-reeling tape 20 which has been previously described in connection with the views of FIGS. 2 and 3. The case 62 is constructed as described above so as to include the block 31 which supports the clear plastic member 34, also previously described.

As shown in FIG. 9 the support bar 56 on the wheel opposite the one shown in FIG. 8 carries a sleeve 64 which is formed with a threaded sleeve 65 for mounting a threaded locking pin 66. The surface of the sleeve 65 facing the locking pin 66 is formed with a series of apertures 67 which have the same spacing as the apertures 60 in the bar 52 so that when the sleeve 57 on bar 52 is adjusted to a given tire diameter the sleeve 64 on the support bar 56 can likewise be adjusted to the same aperture position and locked by threading the locking pin 66 so its projection 68 will enter the selected one of the apertures 67. The bars 52 and 56 are, of course, formed at the forward ends with a series of facing holes to match the holes at the rear ends of these bars. While sleeves 57 and 64 will accommodate a checking device as described, it is recognized the device seen in FIGS. 2 and 3 can use sleeves and rely upon the locking pins as set screws so as to avoid the need for holes of any kind.

It should be clear that the operation of the modified checking device requires the positioning of the case 62 at the rearward end of the support bar 52 and at the same time the retainer 69 carried on the opposite bar 56 should be aligned with the sleeve 57. The tape 20 may then be extended so that its end fitting 19 can be engaged in the hole 18 in the retainer 69 for the purpose of determining, as above described, the measurement related to the dimension behind the rear treads of the steerable wheels. This measurement is then remembered so that the sleeve 57 and 64 can be released from the respective support bars 52 and 56 and moved to the forward ends thereof. The tape 20 is again extended from the case 62 so that its end fitting 19 can be again engaged in the hole 18 of the aligned retainer 69. The forward location of the checking device tape will reveal, as before described, a dimensional figure representing the spacing at the front of the wheel treads, and by manipulating the vernier slide 40 the total toe of the vehicle wheels can be determined visually.

From the foregoing description, with reference to the drawings, it can be seen that vehicle alignment checking device provides a uniquely simple construction which will quickly determine the steerable wheel toe alignment, without the need for mental calculations because the movable members which are provided with suitable scales and index markings produce very easily the necessary calculations by observation. While this description had discussed the use of the various forms of the checking device to find total wheel toe at the front of the wheel treads, it is understood that the equivalent result can be obtained by performing the total toe calculation at the tape behind the wheel treads. It is also understood that the device 11 seen in FIG. 1 may be constructed as shown at 53 in FIG. 8, the object being to provide means to compensate for runout in locating the means 12 or 52 so that substantial accuracy is obtainable.

What is claimed is:

1. A vehicle wheel alignment checking device for determining the toe condition of a pair of vehicle wheels, said device comprising: support bars mounted one on each of the wheels in positions to extend rearwardly beyond the wheel treads and to extend forwardly beyond the wheel treads; retainer means carried by one of said support bars; measuring means carried by the other one of said support bars in opposed alignment with said retainer means, said measuring means being a reel tape having casing means enclosing the tape and from which the tape is extendable to have an end held by said opposed retainer means; and measurement calculating means cooperating with said measuring means in its extended position for determining the difference in the measured distance rearwardly and forwardly of the wheel treads, said calculating means including an index member establishing the measurement forwardly of the wheel treads, said index member being mounted adjacent said casing means to be adjacent the path of tape extension toward said retainer means; and a member positioned adjacent and movable relative to said index member for displaying the measurement obtained rearwardly of the wheel treads in relation to said index member.

2. The checking device set forth in claim 1, wherein said device includes a second index member; a flexible element connecting said second index member to said first mentioned index member, said flexible element positioning said second index member selectively retracted from and in position adjacent said reel tape; a slide member having a connection with said reel tape and being positionable adjacent said second index member; and a vernier element on said second index member in position for cooperation with said second index member and said slide member upon relative movement between said slide member and said second index member.

3. The checking device set forth in claim 1, wherein said index member and said movable member are transparent and are positioned in overlying relation with each other and with said measuring means, and said measuring means is provided with a measuring scale visible through said transparent members.

4. A vehicle wheel alignment checking device comprising: adapters mountable on the respective wheels of the vehicle to be checked for alignment; support means on each adapter with opposite ends extending beyond the tread limits of the respective wheels so as to be in transverse alignment across the vehicle; alignment measuring means operatively carried on said opposite ends of one of said support means, each of said measuring means being extensible across the vehicle to adjacent the opposite one of said support means and having lineal increments marked thereon; retainer means on said opposite one of said support means for retaining said measuring means in extended positions in front of and behind the treads of the respective wheels; first transparent indicator means associated with said measuring means behind the wheel treads for visually scaling the transverse lineal increments of said measuring means in that position; second transparent indicator means associated with said measuring means in front of the wheel treads for visually scaling the transverse lineal increments of said measuring means in that position; and transparent vernier means operably associated with and movable relative to one of said transparent indicator means for visually showing the difference in said scaled transverse lineal increments.

5. The checking device set forth in claim 4, wherein said first and second indicator means associated with said respective measuring means behind and in front of said wheel treads are substantially identical and each has a measurement index mark spaced substantially the same distance from the position of said measuring means on said one support means, and said lineal increments marked on said measuring means are movable relative to and scaled by said first and second transparent indicator means.

6. The checking device set forth in claim 5, wherein said transparent vernier means carries a zero index and toe in and toe out increments to either side thereof, and is operable relative to one of said transparent indicator means for detecting the incremental differences between said lineal increments on said measuring means registering with said zero index.

* * * * *